Dec. 13, 1927.
H. J. TANNENBAUM ET AL
1,652,745
ELECTRIC TOASTING AND HEATING APPLIANCE
Filed Feb. 2, 1927
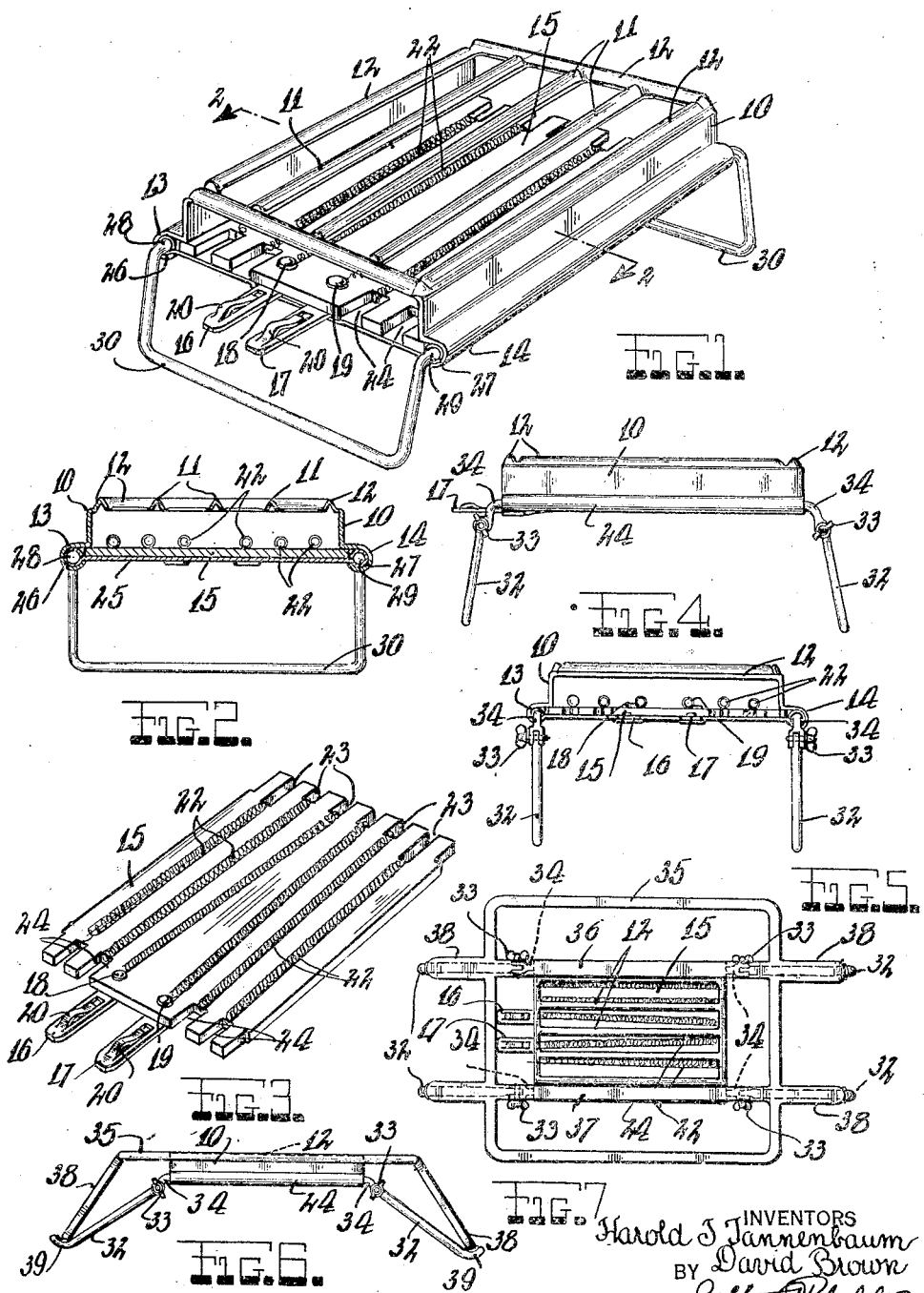
INVENTORS
Harold J Tannenbaum
BY David Brown
ATTORNEY Patented Dec. 13, 1927.

1,652,745

UNITED STATES PATENT OFFICE.

HAROLD J. TANNENBAUM AND DAVID BROWN, OF NEW YORK, N. Y., ASSIGNORS TO ELECTRECONOMY, INC., A CORPORATION OF NEW YORK.

ELECTRIC TOASTING AND HEATING APPLIANCE.

Application filed February 2, 1927. Serial No. 165,342.

This invention relates to a new and useful device in the nature of an electric heating appliance, particularly adapted for heating water, cooking, and the like.

The object of the invention is to provide an electric heating appliance of novel construction and arrangement of parts, hereinafter more fully described, claimed, and illustrated in the accompanying drawing.

Fig. 1 is a perspective view of our improved electric heating appliance.

Fig. 2 is a transverse sectional view taken on the line 2—2 of Fig. 1.

Fig. 3 is a perspective detail view of the heating element unit as embodied in our improved appliance.

Fig. 4 is a side elevational view illustrating a modification of our improved appliance.

Fig. 5 is an end elevational view thereof.

Fig. 6 is a similar view thereof, showing the extension member attached thereto.

Fig. 7 is a top plan view thereof.

As here embodied, our improved electric heating appliance comprises a supporting member consisting of a rectangular shaped member 10, provided with a plurality of longitudinal elements 11, formed or bent curved or semicircular in cross section, similar to the inwardly projecting elements 12 of the rectangular shaped member 10. The rectangular shaped member 10 is provided with lower side extended portions 13 and 14, formed or bent, so as to provide tubular portions. The above described construction being such as will permit the rectangular shaped member 10 to support a receptacle, cooking utensil, or the like, and which will permit the above mentioned semicircular shaped longitudinal elements, and the similarly formed inwardly projecting elements, of the said rectangular member 10, to radiate the heat from the hereinafter described heating element unit, as a means of heating water, cooking food, or the like, contained in the above mentioned utensil.

As here embodied, the electric heating element unit, as embodied in our improved appliance, comprises plate member 15. The electric plug connectors 16 and 17, are attached at one extremity, as at 18 and 19 by rivets, screws, bolts, or the like, to one end of the plate member 15, and are extended therefrom. The electric plug connectors 16 and 17 are provided with longitudinally extended elements 20, formed or bent therefrom, and having intermediately raised portions. The latter described construction being such as will permit the electric plug connectors 16 and 17 to detachably engage apertures formed in an electric socket connector, such as commonly used and connected, by means of electric wires to any suitable convenient source of electric current, the said engagement being insured by the intermediately raised portions of the longitudinally extended elements 20. The flexible member 21, preferably wire such as generally used for electric heating units, is attached to the rivets 18 and 19, and is extended therefrom, and is formed or wound into coils 22, on the upper surface of the plate member 15, and is held or maintained in the desired position thereon, by elongated slots 23 and 24, formed or cut in the ends of the plate member 15. The latter described construction being of common construction such as generally employed to provide an electric heating unit, for the purpose as above set forth.

The plate member 15 is adapted to slidably engage in the above mentioned tubular portions of the rectangular member 10. The lower plate member 25, preferably of sheet asbestos, or any similar suitable insulating material, is adapted to slidably engage in the tubular portions of the rectangular member 10, and is positioned below the said plate member 15. The lower plate member 25, is provided with side extended elements 26 and 27, located at both ends of the said lower plate member 25, as a means of providing a suitable insulating medium for the upper portions 28 and 29 of the leg members 30 and 31, adapted to engage in the said tubular portions of the rectangular member 10, and extended therefrom, so as to form a means of supporting our improved appliance.

In Figs. 4, 5, 6, and 7 of the accompanying drawing, we have provided leg members 32, hinged as at 33, by a threaded member, a wing nut, set screw or the like, to the supporting members 34, adapted to engage in the above mentioned tubular portions of the rectangular member 10. The above described construction being such as will permit our improved appliance to be supported at any desired height. The extension member 35, of rectangular shaped construction, is relatively of larger dimensions than the above mentioned rectangular member 10 and is provided with intermediate longitudinal elements 36 and 37, adapted to engage over the side portions of the rectangular member 10. The extension member 35 is provided with angularly disposed portions 38, extended downwardly therefrom, and adapted to engage the lower extremities 39 of the leg member 32 which are formed or bent upwardly, and adapted to receive the lower extremities of the angularly disposed portions 38 of the extension member 35. the latter described construction being such as will permit utensils of a larger size to be used in connection with our improved appliance as is obvious.

Having thus described our invention, what we claim as new and desire to protect by Letters Patent of the United States is as follows:

1. In an electric heating appliance of the class described, a rectangular frame comprising spaced apart longitudinal sides, substantially tubular extensions on the lower edges of said sides, inwardly directed extensions on the upper edges of said sides comprising semi-cylindrical members, semi-cylindrical cross members connecting the ends of said sides, semi-cylindrical members disposed longitudinally of said frame extending from one end cross member to the other, said semi-cylindrical members and extensions being disposed with their concave surface downwardly and adapted to radiate heat, and leg members mounted in the tubular extensions of the sides of said frame for supporting the same in spaced relation to a horizontal supporting surface.

2. In an electric heating appliance of the class described, a frame comprising spaced apart sides, hollow extensions of substantially cylindrical shape formed on the lower edges of said sides, a plate comprising heat resisting material disposed across the bottom of said frame, extensions on said plate disposed within the substantially cylindrical extension of said sides and formed to conform with the inner surface of said hollow cylindrical extensions, and leg members disposed within said hollow cylindrical extensions, the extensions of said heat resisting plate being disposed between said leg members and the inner surface of said hollow cylindrical extensions for preventing transfer of heat from the sides of said frame to said leg members.

3. In an electric heating appliance of the class described, a frame comprising spaced apart sides, hollow extensions of substantially cylindrical shape formed on the lower edges of said sides, a plate comprising heat resisting material disposed across the bottom of said frame, extensions on said plate disposed within the substantially cylindrical extension of said sides and formed to conform with the inner surface of said hollow cylindrical extensions, leg members disposed within said hollow cylindrical extensions, the extensions of said heat resisting plate being disposed between said leg members and the inner surface of said hollow cylindrical extensions for preventing transfer of heat from the sides of said frame to said leg members, and a detachable heating element comprising a plate slidably mounted on said first mentioned plate.

4. In an electric heating appliance of the class described, a frame comprising longitudinal side offset portions intermediate the top and bottom edges of said sides, tubular members on the lower edge of said offset portions having longitudinal slots therein, a plate comprising heat resisting material disposed across the bottom of said frame, extensions on said plate extended through said slots into the interior of said tubular members, leg members mounted in said tubular member and disposed downwardly therefrom, the extension of said plate being disposed around said leg members between the same and said tubular members for preventing the transfer of heat from the latter to the former, and a heating element disposed above said plate and engaged at its side portions between the latter and the offset portion of the sides of said frame.

In testimony whereof we have affixed our signatures.

HAROLD J. TANNENBAUM.
DAVID BROWN.